Patented Feb. 18, 1941

2,232,598

UNITED STATES PATENT OFFICE 2,232,598

HYDROGENATION OF NITRILES

Mark W. Farlow, Wilmington, Del., assignor to E. I. du Pont de Nemours & Company, Wilmington, Del., a corporation of Delaware No Drawing. Application September 17, 1938, Serial No. 230,391

13 Claims. (Cl. 260—561)

This invention relates to catalytic hydrogenation processes and to the products produced thereby. More particularly, it relates to the catalytic hydrogenation of nitriles in the presence of esters and, specifically, to a process for catalytically hydrogenating nitriles in the presence of low molecular weight esters.

It is known that by the catalytic hydrogenation of nitriles in the absence of solvents (or in the presence of inert solvents) mixtures of primary, secondary, and tertiary amines may be obtained. It is also known that in the hydrogenation of nitriles the presence of ammonia or mineral acids favors the formation of primary amines, and, finally, it is reported that hydrogenation of nitriles in the presence of organic acid anhydrides gives primary amines in the form of their acyl derivatives.

It is an object of this invention to provide a catalytic process for the conversion of nitriles to amides in high yields, said amides being derived from the primary amines corresponding to the nitrile being hydrogenated. A further object is to convert nitriles into amides under essentially neutral conditions. Other objects and advantages will be apparent from the following specification.

The above and other objects appearing hereinafter are accomplished by means of the following invention which comprises catalytically hydrogenating a nitrile in the presence of a neutral ester at a temperature between 25° C. and 200° C. and at a hydrogen pressure from 25 to 3000 pounds per square inch. In the practice of this invention it is generally preferred to carry out the hydrogenation at the lowest temperature at which a reasonably rapid hydrogen absorption occurs. This temperature, in turn, depends to a large extent on what nitrile is being hydrogenated, but is usually within the more restricted temperature range of 25 to 125° C.

Pressures employed may likewise vary over a wide range, the reactions being more rapid, in general, at the higher pressures. Thus, to illustrate, hydrogen pressures of 25 to 3000 pounds per square inch have been used, although it is preferred to operate at the lowest pressure consistent with a reasonably rapid rate of reaction. Preferred variations in pressure are more specifically shown in the examples.

Any active hydrogenation catalyst may be employed in the practice of this invention. Pyrophoric or stabilized nickel catalysts either in the massive state or supported on suitable powdered materials such as kieselguhr or pumice are most effective in the practice of this invention. However, hydrogenation catalysts in general are operative in the practice of this invention and any hydrogenation catalyst comprising as its essential component a hydrogenating metal, oxide, or salt of platinum, silver, and copper, as well as the metals, oxides, and salts of the base metals of the 8th group of the periodic table may be used.

Any ester may be utilized according to this invention such, for example, as methyl formate, methyl acetate, ethyl formate, ethyl oxalate, ethyl acetate, butyl butyrate, isobutyl propionate, methyl caproate, methyl laurate, benzyl acetate, propionate, butyrate, etc., glycol and glycerol acetates, propionates, butyrates and the like, ethyl, propyl, butyl and amyl benzoates, ethyl naphthenate, and the like. It is preferred, however, to utilize esters of monohydric alcohols and monocarboxylic acids, especially those of low molecular weight inasmuch as they permit a lower ester-nitrile ratio than is otherwise possible. Methyl formate, because of its greater reactivity, low molecular weight, low cost, and availability is an example of an ester which is particularly preferred. It is generally preferred to employ an excess of the ester over the equimolar equivalent of the nitrile as it then functions both as a reactant and as a solvent. If desired, however, an inert solvent, e. g., methanol, ethanol, dioxan, and the like may be added to the reaction mixture in addition to the ester, and in such cases the amount of ester need not exceed the equimolar equivalent of the nitrile.

Nitriles for use in the practice of this invention may be prepared by any of the known methods such, for example, as by treatment of an alkyl halide with sodium cyanide, dehydration of amides with phosphorus pentoxide, phosgene, thionyl chloride, etc. This invention is applicable to the preparation of amides from mono- and dinitriles as well as from nitriles containing other functional groups, in addition to the nitrile group, e. g., hydroxyl, amino, etc.

The following examples will serve to illustrate preferred methods of operation under the present invention:

*Example I.*—To fourteen and twenty-five hundredths grams of glycolonitrile was added 60 grams of methyl formate and five grams of an unsupported nickel catalyst. The mixture was then hydrogenated at room temperature under a hydrogen pressure of 40–50 lb./sq. in., small additional amounts of catalyst being added whenever necessary. Hydrogen absorption, which amounted to 85% of the theoretical, was complete after 36 hours. The crude product, β-hydroxy-ethyl formamide, was light yellow in color. The product was identified by hydrolyzing a portion of the amide to β-hydroxy-ethyl amine and identification of the latter as the benzoyl derivative which melted at 84–85° C.

*Example II.*—A solution of 11.2 grams of glycolonitrile in 74 grams of ethyl formate was hydrogenated as in Example I. The absorption of 65% of the theoretical amount of hydrogen was complete after about three hours.

*Example III.*—A solution of 100 grams of lauronitrile in 150 grams of ethyl acetate was hydrogenated at 125° C. in the presence of a nickel-on-kieselguhr catalyst under a hydrogen pressure of 2000-3000 lb./sq. in. When hydrogen absorption was complete the catalyst was removed from the crude product by filtration. After evaporation of the ethanol and ethyl acetate the solid residue was recrystallized from low-boiling petroleum ether giving colorless N-lauryl acetamide, m. p. 55-56° C.

*Example IV.*—A solution of 60 grams of succinonitrile in 135 grams of methyl formate was hydrogenated in the presence of an active cobalt catalyst at 65-85° C. under a hydrogen pressure of 2000-3000 lb./sq. in. Hydrogen absorption was complete at the end of one hour. The product, after removal of the catalyst by filtration, was evaporated to dryness with 200 cc. of concentrated hydrochloric acid, this process converting the substituted formamides into amine hydrochlorides. The solid residue was distilled from a slight excess of moist sodium hydroxide at a pressure of 10-20 millimeters. The distillate, on redistillation, gave a 70% yield of tetramethylene diamine together with 8% of pyrrolidine.

*Example V.*—A solution of 72 grams of adiponitrile in 120 grams of methyl formate was hydrogenated at 120° C. in the presence of an active cobalt catalyst and under a hydrogen pressure of 2,000-3,000 lb./sq. in. The crude product was filtered to remove catalyst, then evaporated on a steam bath. The oily residue, which amounted to almost the theoretical yield, solidified on cooling. Recrystallization from methanol-ether gave pure N,N'-diformyl hexamethylene diamine.

The process of this invention is adapted to the production of amines since these may be obtained by hydrolysis of the amides obtained in the hydrogenation step. This important embodiment is illustrated in the following example.

*Example VI.*—To 1086 grams of dimethylaminoacetonitrile was added 1550 grams of methyl formate and the solution hydrogenated at 50 to 75° C. in the presence of an active nickel catalyst under a hydrogen pressure of about 1500 lbs./sq. in. Hydrogen absorption was complete in about one hour. The catalyst was removed by filtration and the low boiling constituents removed by distillation. The residue was hydrolyzed by boiling for 25 hours with a 50 excess of 20 potassium hydroxide over the amount theoretically required for the amide. The amines were extracted from the aqueous layer with benzene and the extracts dried over potassium hydroxide, filtered, and distilled. Five hundred six grams of N,N dimethyl ethylene diamine, b. p. 107-108° C. at atmospheric pressure, along with 245 grams of bi. (dimethylaminoethyl) amine, b. p. 91-92° C./24 m. m.;

$N_D^{25} 1.4410$; sp. gr. $^{25}_{25} 0.8304$ were obtained.

In place of the nitriles of the examples there may be used ω-amino-capronitrile, ω-amino-caprilonitrile, N,N - dimethylaminoacetonitrile, stearonitrile, palmitonitrile, and other long chain fatty acid nitriles, β-hydroxypropionitrile, tartaronitrile, nitriles from the naphthenic acids, suberonitrile, sebaconitrile, etc.

Various changes may be made in the details of this invention without sacrificing the advantages thereof or departing therefrom.

I claim:
1. A process for producing amides which comprises catalytically hydrogenating a saturated aliphatic nitrile in the presence of a carboxylic acid ester.

2. A process for producing amides which comprises catalytically hydrogenating a saturated aliphatic nitrile in the presence of an ester of an aliphatic monohydric alcohol and an aliphatic monocarboxylic acid and of a hydrogenation catalyst.

3. A process for producing amides which comprises catalytically hydrogenating a saturated aliphatic nitrile at a hydrogen pressure in the range of 25 to 3000 pounds per square inch, at a temperature in the range of 25 to 200° C., and in the presence of a quantity of an ester of an aliphatic monohydric alcohol and an aliphatic monocarboxylic acid at least equal to the molar equivalent of the nitrile, the hydrogenation being effected in the presence of a hydrogenation catalyst.

4. A process for producing amides which comprises catalytically hydrogenating a saturated aliphatic nitrile at a hydrogen pressure in the range of 25 to 3000 pounds per square inch, at a temperature in the range of 25 to 200° C., and in the presence of a quantity of an ester of an aliphatic monohydric alcohol and an aliphatic monocarboxylic acid in excess of the molar equivalent of the nitrile, the hydrogenation being effected in the presence of a hydrogenation catalyst.

5. A process for producing amides which comprises catalytically hydrogenating a saturated aliphatic nitrile at a hydrogen pressure in the range of 25 to 3000 pounds per square inch, at a temperature in the range of 25 to 200° C., and in the presence of a quantity of methyl formate in excess of the molar equivalent of the nitrile, the hydrogenation being effected in the presence of a hydrogenation catalyst.

6. A process for producing amides which comprises catalytically hydrogenating a saturated aliphatic nitrile at a hydrogen pressure in the range of 25 to 3000 pounds per square inch, at a temperature in the range of 25 to 200° C., and in the presence of a quantity of methyl formate in excess of the molar equivalent of the nitrile, the hydrogenation being effected in the presence of a nickel-on-kieselguhr catalyst.

7. A process for producing amides which comprises catalytically hydrogenating a saturated aliphatic nitrile at a hydrogen pressure in the range of 25 to 3000 pounds per square inch, at a temperature in the range of 25 to 125° C., and in the presence of a quantity of an ester of an aliphatic monohydric alcohol and an aliphatic monocarboxylic acid at least equal to the molar equivalent of the nitrile, the hydrogenation being effected in the presence of a hydrogenation catalyst.

8. A process for producing amides which comprises catalytically hydrogenating a saturated aliphatic nitrile at a hydrogen pressure in the range of 25 to 3000 pounds per square inch, at a temperature in the range of 25 to 125° C., and in the presence of a quantity of an ester of an aliphatic monohydric alcohol and an aliphatic monocarboxylic acid in excess of the molar equivalent of the nitrile, the hydrogenation being effected in the presence of a hydrogenation catalyst.

9. A process for producing amides which comprises catalytically hydrogenating a saturated aliphatic nitrile at a hydrogen pressure in the range of 25 to 3000 pounds per square inch, at a temperature in the range of 25 to 125° C., and in the presence of a quantity of methyl formate in excess of the molar equivalent of the nitrile, the hydrogenation being effected in the presence of a hydrogenation catalyst.

10. A process for producing amides which comprises catalytically hydrogenating a saturated aliphatic nitrile at a hydrogen pressure in the range of 25 to 3000 pounds per square inch, at a temperature in the range of 25 to 125° C., and in the presence of a quantity of methyl formate in excess of the molar equivalent of the nitrile, the hydrogenation being effected in the presence of a nickel-on-kieselguhr catalyst.

11. A process for producing amides which comprises catalytically hydrogenating a saturated aliphatic dinitrile in the presence of an ester of an aliphatic monohydric alcohol and an aliphatic monocarboxylic acid, the hydrogenation being effected in the presence of a hydrogenation catalyst.

12. A process for producing amides which comprises catalytically hydrogenating an adiponitrile in the presence of an ester of an aliphatic monohydric alcohol and an aliphatic monocarboxylic acid, the hydrogenation being effected in the presence of a hydrogenation catalyst.

13. A process for producing amides which comprises catalytically hydrogenating lyconitrile in the presence of an ester of an aliphatic monohydric alcohol and an aliphatic monocarboxylic acid, the hydrogenation being effected in the presence of a hydrogenating catalyst.

MARK W. FARLOW.

CERTIFICATE OF CORRECTION.

Patent No. 2,232,598. February 18, 1941.

MARK W. FARLOW.

It is hereby certified that error appears in the printed specification of the above numbered patent requiring correction as follows: Page 1, second column, line 44, for "hundrdeths" read --hundredths--; page 3, second column, line 15, claim 13, for "lyconitrile" read --glyconitrile--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.